Patented Dec. 3, 1935

2,022,956

UNITED STATES PATENT OFFICE 2,022,956

MANUFACTURE OF DYESTUFFS OF THE ANTHRAQUINONE SERIES

Henry Dreyfus, London, England

No Drawing. Original application January 22, 1927, Serial No. 162,936. Divided and this application September 19, 1931, Serial No. 563,907. In Great Britain November 23, 1926

12 Claims. (Cl. 260—60)

This invention relates to the manufacture of dyestuffs of the anthraquinone series and is more particularly directed to the manufacture of hydroxy alkylamino anthraquinones.

According to the present invention hydroxy alkylamino anthraquinones are prepared by acting upon an anthraquinone containing a phenolic or halogen group or groups, i. e. negatively substituted anthraquinones, with an amino alcohol. In the case of treating anthraquinones containing a phenolic group or groups it is extremely advantageous to reduce the compound to the leuco state in order to bring it to reaction with the amino alcohol. Furthermore α substituted products are best treated according to the present invention, and in the case of an α-hydroxy anthraquinone it is advantageous to use as starting material a 1-hydroxy anthraquinone containing an amino or hydroxy group in the 4-position.

As examples of amino alcohols which may be employed according to the present invention I may instance β-amino ethyl alcohol (mono ethanolamine) and γ-amino-α β dihydroxy propane.

The dyestuffs prepared according to the present invention are very valuable for the coloration, e. g. dyeing, printing or stencilling, of materials made of or containing cellulose acetate or other organic esters of cellulose, such for example as cellulose formate, propionate or butyrate, or the product obtained by the treatment of alkalized cellulose with paratoluene sulpho-chloride (e. g. the product known as "immunized cotton"), or made of or containing cellulose ethers, such as methyl, ethyl or benzyl cellulose. The application of the dyestuffs to these materials forms the subject matter of my co-pending application S. No. 162,936 filed January 22, 1927, patented April 19, 1932, Patent No. 1,854,460, from which the present application is a divisional application.

The following examples illustrate the manufacture of the dyestuffs according to the present invention:—

Example 1

α-chloranthraquinone is heated in an autoclave with excess of β-amino-ethyl alcohol and methylated spirits until reaction is complete. The mass is allowed to cool, filtered and purified. The product

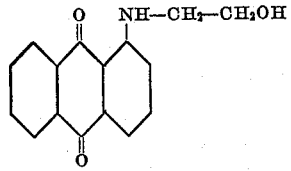

dyes cellulose acetate a full shade of scarlet.

Example 2

1-hydroxy-4-aminoanthraquinone is reduced to the leuco state by treatment with caustic soda and sodium hydrosulphite and the leuco body precipitated by pouring into hydrochloric acid. The dried precipitate is refluxed on a water bath with slightly more than 1 molecular proportion of β-aminoethyl alcohol and methylated spirits. The resulting leuco compound is oxidized to yield a dyestuff of the probable formula

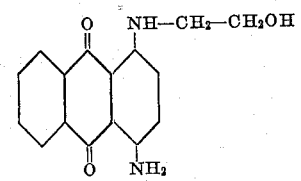

The dyestuff dyes cellulose acetate a bluish violet shade.

In a similar manner other oxy alkylamino anthraquinones may be produced as for example:

1,4-di(β-hydroxy-ethylamino)-anthraquinone, which dyes cellulose acetate a pure blue shade, 1-hydroxy-4 - β - hydroxy - ethylamino anthraquinone which dyes cellulose acetate violet.

What I claim and desire to secure by Letters Patent is:—

1. Process for the manufacture of anthraquinone dyestuffs which comprises reacting with an amino alcohol on an α-negatively-substituted anthraquinone in which the negative substituent is capable of being replaced by an amino group by the action of an amine.

2. Process for the manufacture of anthraquinone dyestuffs, comprising reacting an α-chlor anthraquinone with an amino alcohol.

3. Process for the manufacture of anthraquinone dyestuffs, comprising reacting an α-chlor anthraquinone with β-amino-ethyl alcohol.

4. Process for the manufacture of anthraquinone dyestuffs, comprising reacting a leuco α-hydroxy anthraquinone with an amino alcohol.

5. Process for the manufacture of anthraquinone dyestuffs, comprising reacting with an amino alcohol upon a leuco anthraquinone containing at least one hydroxy group in an α-position and at least one amino group in an α-position.

6. Process for the manufacture of anthraquinone dyestuffs, comprising reacting with an amino alcohol upon a leuco anthraquinone containing at least one hydroxy group in the α-position.

7. Process for the manufacture of anthraquinone dyestuffs, comprising reacting a leuco α-hydroxy anthraquinone with β-amino-ethyl alcohol.

8. Process for the manufacture of anthraquinone dyestuffs, comprising reacting with β-amino-ethyl alcohol upon a leuco anthraquinone containing at least one hydroxy group in an α-position and at least one amino group in an α-position.

9. Process for the manufacture of anthraquinone dyestuffs, comprising reacting with β-amino-ethyl alcohol upon a leuco anthraquinone containing at least one hydroxy group in the α-position.

10. Process for the manufacture of anthraquinone dyestuffs, comprising reacting with an amino alcohol upon a leuco anthraquinone containing a hydroxy group in the 1-position and a hydroxy group in the 4-position.

11. Process for the manufacture of anthraquinone dyestuffs, comprising reacting with an amino alcohol upon a leuco anthraquinone containing a hydroxy group in the 1-position and an amino group in the 4-position.

12. Process for the manufacture of anthraquinone dyestuffs, comprising reacting with β-amino ethyl alcohol upon a leuco anthraquinone containing a hydroxy group in the 1-position and a hydroxy group in the 4-position.

HENRY DREYFUS.